United States Patent
Shahbazi et al.

(10) Patent No.: US 12,373,117 B2
(45) Date of Patent: Jul. 29, 2025

(54) SELECTIVELY POWERED EMBEDDED MEMORY SYSTEMS AND METHODS

(71) Applicant: Lattice Semiconductor Corporation, Hillsboro, OR (US)

(72) Inventors: Maryam Shahbazi, Walnut Creek, CA (US); Loren L. McLaury, Hillsboro, OR (US); Bradley A. Sharpe-Geisler, San Jose, CA (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 0 days.

(21) Appl. No.: 18/523,764

(22) Filed: Nov. 29, 2023

(65) Prior Publication Data
US 2024/0184459 A1    Jun. 6, 2024

Related U.S. Application Data

(60) Provisional application No. 63/429,490, filed on Dec. 1, 2022.

(51) Int. Cl.
*G06F 3/06* (2006.01)

(52) U.S. Cl.
CPC .......... *G06F 3/0625* (2013.01); *G06F 3/0634* (2013.01); *G06F 3/0673* (2013.01)

(58) Field of Classification Search
CPC ..... G06F 3/0625; G06F 3/0634; G06F 3/0673
See application file for complete search history.

(56) References Cited

U.S. PATENT DOCUMENTS

| | | | |
|---|---|---|---|
| 7,352,647 B1 * | 4/2008 | Saini | G11C 11/413 365/189.011 |
| 2008/0104324 A1 * | 5/2008 | Raghuvanshi | G06F 12/0802 713/300 |
| 2008/0195875 A1 | 8/2008 | Hobson | |
| 2012/0002499 A1 | 1/2012 | Kinkade et al. | |
| 2013/0073886 A1 | 3/2013 | Zaarur | |
| 2019/0265778 A1 | 8/2019 | Srinivas et al. | |

* cited by examiner

*Primary Examiner* — Edward J Dudek, Jr.
(74) *Attorney, Agent, or Firm* — Haynes and Boone, LLP

(57) ABSTRACT

Various techniques are provided for selectively operating a memory block in full power or half power modes. In one example, a system comprises a memory block configured to be selectively operated in a full power mode or a half power mode. The memory block comprises an input/output port. The memory block further comprises a first sub-block configured to be powered on during the full power mode and during the half power mode. The memory block further comprises a second sub-block configured to be powered on during the full power mode and powered off during the half power mode. The memory block further comprises routing hardware configured to pass data between the input/output port and the first and second sub-blocks. Additional systems and methods are also provided.

20 Claims, 10 Drawing Sheets

SELECTIVELY POWERED EMBEDDED MEMORY SYSTEMS AND METHODS

CROSS REFERENCE TO RELATED APPLICATIONS

This patent application claims priority to and the benefit of U.S. Provisional Patent Application No. 63/429,490 filed Dec. 1, 2022 and entitled "SELECTIVELY POWERED EMBEDDED MEMORY SYSTEMS AND METHODS" which is incorporated herein by reference in its entirety.

TECHNICAL FIELD

This disclosure relates generally to embedded memory and, more specifically, to power saving techniques for embedded memory in programmable logic devices.

BACKGROUND

Programmable logic devices (PLDs), such as field programmable gate arrays (FPGAs), complex programmable logic devices (CPLDs), field programmable systems on a chip (FPSCs), or other types of programmable devices may be configured with various user designs to implement desired functionality. The user designs may be synthesized and mapped into configurable resources (e.g., programmable logic gates, look-up tables (LUTs), embedded hardware, or other types of resources) and interconnections available in PLDs.

The resources of a PLD consume power which is a design consideration for many PLDs. In particular, power consumption can be a unique consideration for certain embedded hardware such memory blocks that store data during operation of the PLD. In conventional PLD implementations, each memory block is implemented with a fixed size and remains fully powered during operation of the PLD if any portion of the memory block is used. As a result, entire memory blocks may remain powered on, even if they are only partially filled with data. This can result in excessive and disproportionate power consumption by the fixed size memory blocks which can limit the efficiency of PLDs, especially in low power, low cost, or mobile applications.

SUMMARY

Various techniques are provided for selectively operating a memory block in full power or half power modes. In one embodiment, a system comprises: a memory block configured to be selectively operated in a full power mode or a half power mode, the memory block comprising: an input/output port; a first sub-block configured to be powered on during the full power mode and during the half power mode; a second sub-block configured to be powered on during the full power mode and powered off during the half power mode; and routing hardware configured to pass data between the input/output port and the first and second sub-blocks.

In another embodiment, a method comprises selectively operating a memory block in a full power mode or a half power mode, the memory block comprising an input/output port, a first sub-block, a second sub-block, and routing hardware; powering on the first sub-block and the second sub-block during the full power mode; powering on the first sub-block and powering off the second sub-block during the half power mode; and selectively passing data by the routing hardware between the input/output port and the first and second sub-blocks.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

In accordance with embodiments disclosed herein, various techniques are provided to reduce power consumption of memory blocks in PLDs. In some embodiments, a memory block may be implemented with at least two sub-blocks (e.g., also referred to as cores) that may be operated together and/or separately to support various power saving capabilities and operational features.

In some embodiments, the memory block may be operated in a full power mode (e.g., also referred to as a "11" mode) such that both of the sub-blocks are used to store data in one or more data words. Various storage configurations may be supported in full power mode. For example, in full power mode, each data word may span both sub-blocks such that each sub-block stores a portion of each data word. In this case, the combined data word length supported by the two sub-blocks may be used to store data words longer than would be supported by either of the sub-blocks individually.

As another example, also in full power mode, data words may be stored separately by each of the sub-blocks (e.g., in an alternating manner). In this case, the individual data word lengths supported by the two sub-blocks are be used to store data words limited to the sub-block data word lengths, but with a greater total number of data words stored in the memory block in comparison to the approach noted above where each data word spans both sub-blocks.

In some embodiments, the memory block may be operated in a half power mode (e.g., also referred to as a "01" mode) such that at least one of the sub-blocks may be selectively powered off (e.g., disabled) if only a portion of the memory block capacity is required. For example, if only half or less than half of the total capacity of the memory block is required for a particular PLD configuration, then one of the sub-blocks may be operated while the remaining sub-block may be powered off. Such an approach can provide significant power savings in many circumstances.

In some implementations, operating the memory block in full power mode (e.g., with both sub-blocks powered) may consume 173 µW of static power and 9.37 µW of dynamic power. In contrast, operating the memory block in half power mode (e.g., with only one of the sub-blocks powered on and keeping remaining sub-block powered off) may consume 99 μW of static power and 5.15 μW of dynamic power, thus providing a power savings of nearly fifty percent.

For example, it has been determined by the present inventors that many PLD configurations may require only a portion (e.g., half or less than half) of their available memory blocks to be operated in full power mode, while the remaining memory blocks are operated in half power mode or completely disabled. Thus, by implementing memory blocks with sub-blocks that may be selectively disabled, substantial power savings may be achieved in real world PLD configurations.

Figure 1:
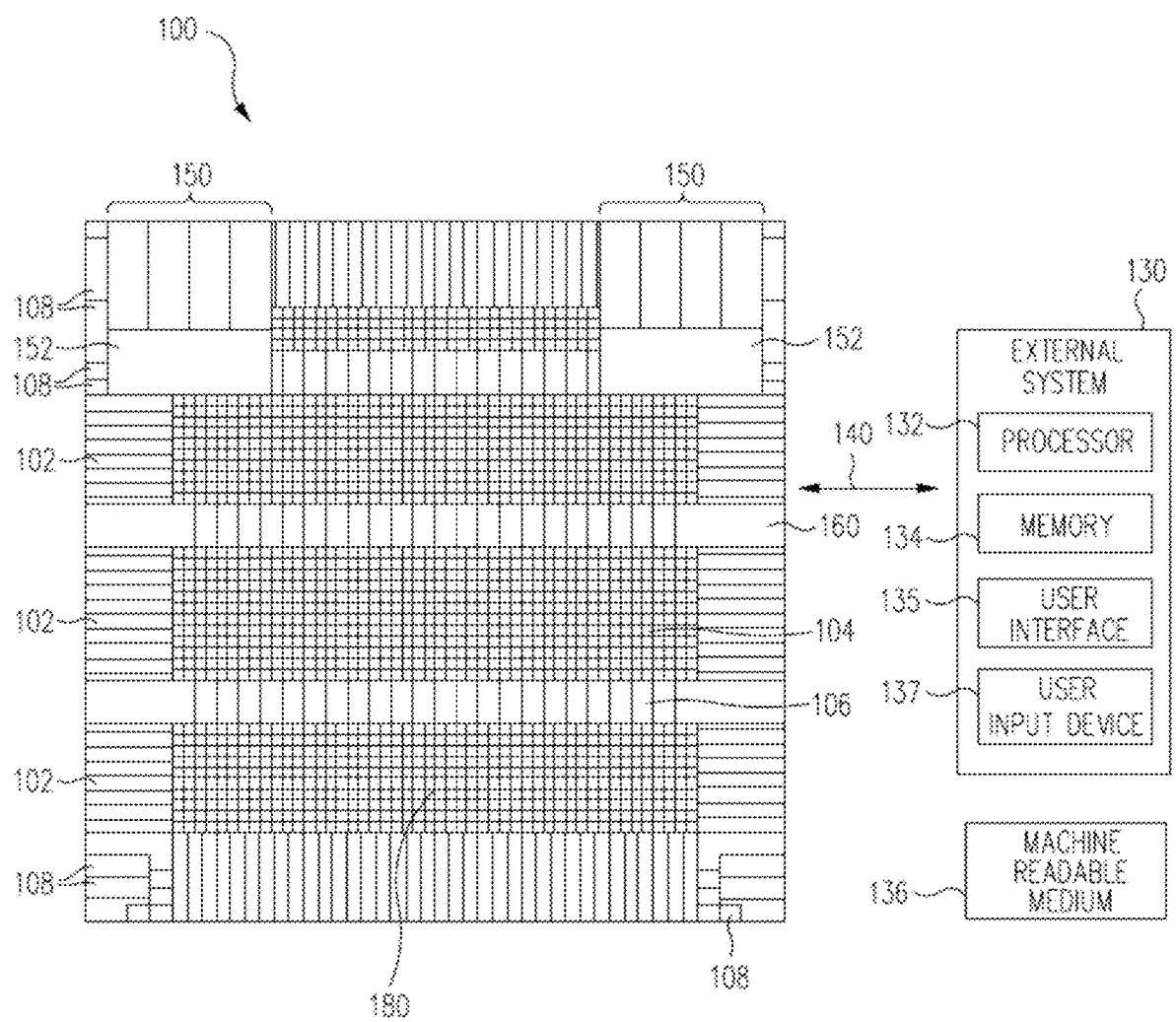
FIG. 1 illustrates a block diagram of a programmable logic device (PLD) in accordance with an embodiment of the disclosure.

Referring now to the drawings, FIG. 1 illustrates a block diagram of a PLD 100 in accordance with an embodiment of the disclosure. PLD 100 (e.g., a field programmable gate array (FPGA)), a complex programmable logic device (CPLD), a field programmable system on a chip (FPSC), or other type of programmable device) generally includes input/output (I/O) blocks 102 and logic blocks 104 (e.g., also referred to as programmable logic blocks (PLBs), programmable functional units (PFUs), or programmable logic cells (PLCs)).

I/O blocks 102 provide I/O functionality (e.g., to support one or more I/O and/or memory interface standards) for PLD 100, while programmable logic blocks 104 provide logic functionality (e.g., look-up table (LUT) logic or logic gate array-based logic) for PLD 100. Additional I/O functionality may be provided by serializer/deserializer (SERDES) blocks 150 and physical coding sublayer (PCS) blocks 152. In various embodiments, I/O blocks 102 and SERDES blocks 150 may route signals to and from associated external ports (e.g., physical pins) of PLD 100. PLD 100 may also include hard intellectual property core (IP) blocks 160 to provide additional functionality (e.g., substantially predetermined functionality provided in hardware which may be configured with less programming than logic blocks 104).

PLD 100 may also include memory blocks 106 (e.g., blocks of EEPROM memory blocks, RAM (e.g., static and/or dynamic) memory blocks, and/or flash memory blocks), clock-related circuitry 108 (e.g., clock sources, PLL circuits, and/or DLL circuits), and/or various routing resources 180 (e.g., interconnect and appropriate switching logic to provide paths for routing signals throughout PLD 100, such as for clock signals, data signals, or others) as appropriate. In various embodiments, routing resources 180 may include user configurable routing resources and hardwired signal paths. In general, the various elements of PLD 100 may be used to perform their intended functions for desired applications, as would be understood by one skilled in the art.

For example, I/O blocks 102 may be used for programming PLD 100, such as memory blocks 106 (e.g., including volatile configuration memory) or transferring information (e.g., various types of data and/or control signals) to/from PLD 100 through various external ports as would be understood by one skilled in the art. I/O blocks 102 may provide a first programming port (which may represent a central processing unit (CPU) port, a peripheral data port, an SPI interface, and/or a sysCONFIG programming port) and/or a second programming port such as a joint test action group (JTAG) port (e.g., by employing standards such as Institute of Electrical and Electronics Engineers (IEEE) 1149.1 or 1532 standards). I/O blocks 102 typically, for example, may be included to receive configuration data and commands (e.g., over one or more connections 140) to configure PLD 100 for its intended use and to support serial or parallel device configuration and information transfer with SERDES blocks 150, PCS blocks 152, hard IP blocks 160, and/or logic blocks 104 as appropriate.

It should be understood that the number and placement of the various elements are not limiting and may depend upon the desired application. For example, various elements may not be required for a desired application or design specification (e.g., for the type of programmable device selected).

Furthermore, it should be understood that the elements are illustrated in block form for clarity and that various elements would typically be distributed throughout PLD 100, such as in and between logic blocks 104, hard IP blocks 160, and routing resources 180 to perform their conventional functions (e.g., storing configuration data that configures PLD 100 or providing interconnect structure within PLD 100). It should also be understood that the various embodiments disclosed herein are not limited to programmable logic devices, such as PLD 100, and may be applied to various other types of programmable devices, as would be understood by one skilled in the art.

An external system 130 (e.g., also referred to as an external device) may be used to create a desired user configuration or design of PLD 100, generate corresponding configuration data to program (e.g., configure) PLD 100, and test the operation of the configured PLD 100. For example, system 130 may provide such configuration data to one or more I/O blocks 102, SERDES blocks 150, and/or other portions of PLD 100. As a result, programmable logic blocks 104, memory blocks 106 (e.g., including the full power, half power, or completely disabled configuration of embedded memory blocks), routing resources 180, and any other appropriate components of PLD 100 may be configured to operate in accordance with user-specified applications.

In the illustrated embodiment, system 130 is implemented as a computer system. In this regard, system 130 includes, for example, one or more processors 132 which may be configured to execute instructions, such as software instructions, provided in one or more memories 134 and/or stored in non-transitory form in one or more non-transitory machine-readable mediums 136 (e.g., a memory or other appropriate storage medium internal or external to system 130). For example, in some embodiments, system 130 may run a PLD configuration application, such as Lattice Diamond System Planner software available from Lattice Semiconductor Corporation to permit a user to create a desired configuration and generate corresponding configuration data to program PLD 100.

System 130 also includes, for example, a user interface 135 (e.g., a screen or display) to display information to a user, and one or more user input devices 137 (e.g., a keyboard, mouse, trackball, touchscreen, and/or other device) to receive user commands or design entry to prepare a desired configuration of PLD 100 and/or to identify various triggers used to evaluate the operation of PLD 100, as further described herein.

Figure 2:
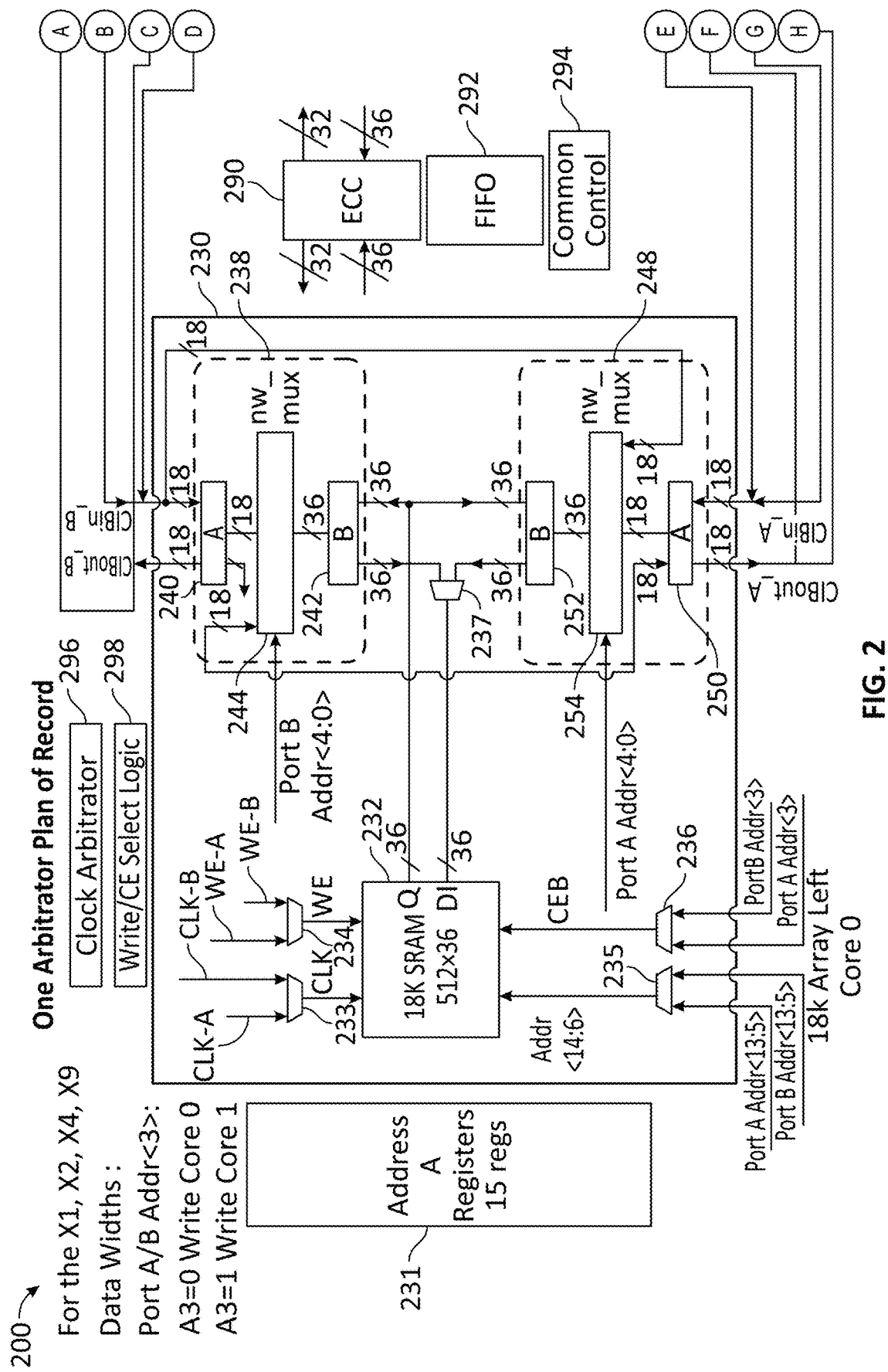
FIG. 2 illustrates a memory block in accordance with an embodiment of the disclosure.
Figure 2:
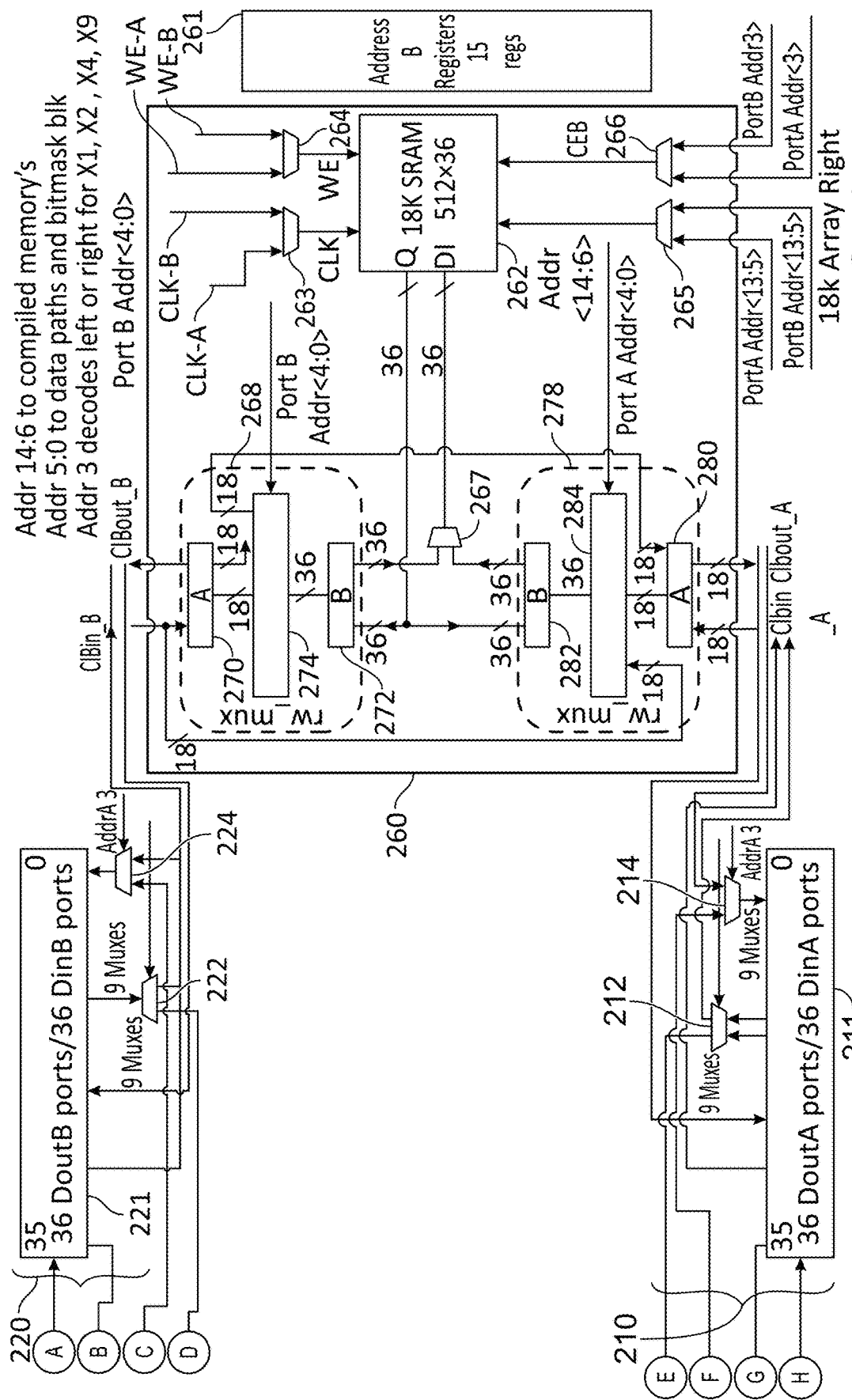

In various embodiments, memory blocks 106 may include embedded memory blocks, each including at least two sub-blocks that may be operated together and/or separately to support various power saving capabilities and operational features as discussed. In this regard, FIG. 2 illustrates a memory block 200 in accordance with an embodiment of the disclosure. In various embodiments, memory block 200 may be an embedded memory block implemented by any of the memory blocks 106 of PLD 100.

As shown, memory block 200 includes I/O ports 210 and 220 (e.g., also referred to as common interface block (CIB) ports), sub-blocks 230 and 260, and address registers 231 and 261. In some embodiments, memory block 200 may include additional components including, for example, an error correction code (ECC) block 290, a first-in-first-out (FIFO) register 292, a common control block 294, a clock arbitrator 296, and a write/clock enable (CE) logic block 298.

I/O ports 210/220 include connections 211/221, input multiplexers 212/222, and output multiplexers 214/224. Connections 211/211 operate to interface I/O ports 210/220 with other components of PLD 100 through routing resources 180 such as one or more CIBs. Sub-blocks 230/260 include memory arrays 232/262, clock signal multiplexers 233/263, write enable signal multiplexers 234/264, address multiplexers 235/236 and 265/266, and routing hardware 238/248/268/278 as further discussed herein.

Memory arrays 232 and 262 may store data that is read from and/or written to I/O ports 210/220. In one embodiment, each of memory arrays 232 and 262 is implemented as a static random access memory (SRAM) array of 18,432 bits (also referred to as 18 kilobits or 18 kb) arranged in 512 rows each having a 36 bit width. Thus, when memory block 200 is operated in a full power mode (e.g., with both of sub-blocks 230 and 260 powered on by control signals provided by logic blocks 104 of PLD 100), a total data capacity of 36,864 bits (also referred to as 36 kilobits or 36 kb) is provided by the combination of memory arrays 232 and 262. When memory block 200 is operated in a half power mode, a total data capacity of 18 kb may be stored in one of memory arrays 232 or 262.

In some embodiments in full power mode, each data word may span both sub-blocks 230 and 260. In FIG. 2, this corresponds to 512 rows of 72 bit width (512×36×2=36,864 bits) supported by the combination of memory arrays 232 and 262. In some embodiments of full power mode, data words may be stored separately by sub-blocks 230 and 260. In FIG. 2, this corresponds to 1024 rows (512×2) of 36 bit width (512×2×36=36,864 bits) supported by the combination of memory arrays 232 and 262.

In some embodiments of half power mode, only one of sub-blocks 230 or 260 is powered on while the remaining one is powered off (e.g., in response to control signals provided by logic blocks 104 of PLD 100). In FIG. 2, this corresponds to 512 rows of 36 bit width (512×36=18,432 bits) supported by one of memory arrays 232 or 262.

Each of memory arrays 232 and 262 may be accessed by PLD 100 through one or both of I/O ports 210 and 220 in various modes of operation. Accordingly, memory arrays 232 and 262 may selectively receive clock signals CLK-A or CLK-B, write enable signals WE-A or WE-B, address signals PortA Addr<13:5> and PortB Addr<13:5>, and address signals PortA Addr<3> and PortB Addr<3> associated with I/O port 210 or 220 as selected by multiplexers 233/263, 234/264, 235/265, and 236/266.

Data is passed between memory arrays 232/262 and I/O ports 210/220 through routing hardware 238/248/268/278 that includes I/O registers 240/250/270/280 for I/O port 210, I/O registers 242/252/272/282 for I/O port 220, and multiplexers 244/254/274/284. As shown, input multiplexers 237/267 further select between data received at I/O port 210 or 220 for writing into data input port DI of memory arrays 232/262.

Accordingly, data received at I/O port 210 (CIBin_A, also denoted cib_in_a and cib_in a) and/or I/O port 220 (CIBin_B, also denoted cib_in_b and cib_in b) may be selectively written to one or both of sub-blocks 230 or 260. Similarly, data stored by one or both of sub-blocks 230 or 260 may be selectively read out of I/O port 210 (CIBout_A, also denoted cib_out_a and cib_out a) and/or I/O port 220 (CIBout_B, also denoted cib_out_b and cib_out b). Such operations may be further understood with reference to FIGS. 3A, 3B, 4A, and 4B as further discussed herein.

Figure 3:
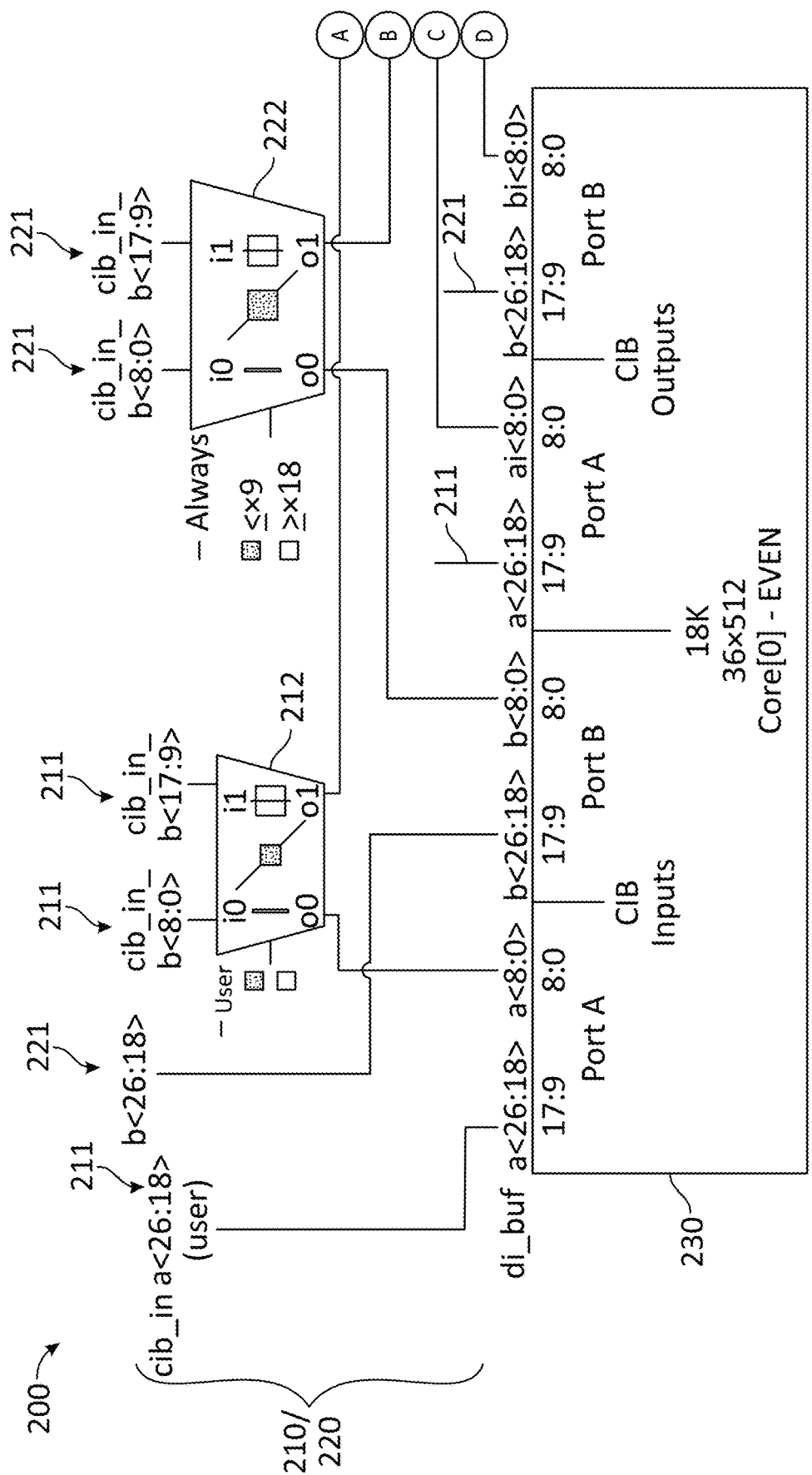
FIG. 3 illustrates a multiplexer architecture of a memory block in accordance with an embodiment of the disclosure.
Figure 3:
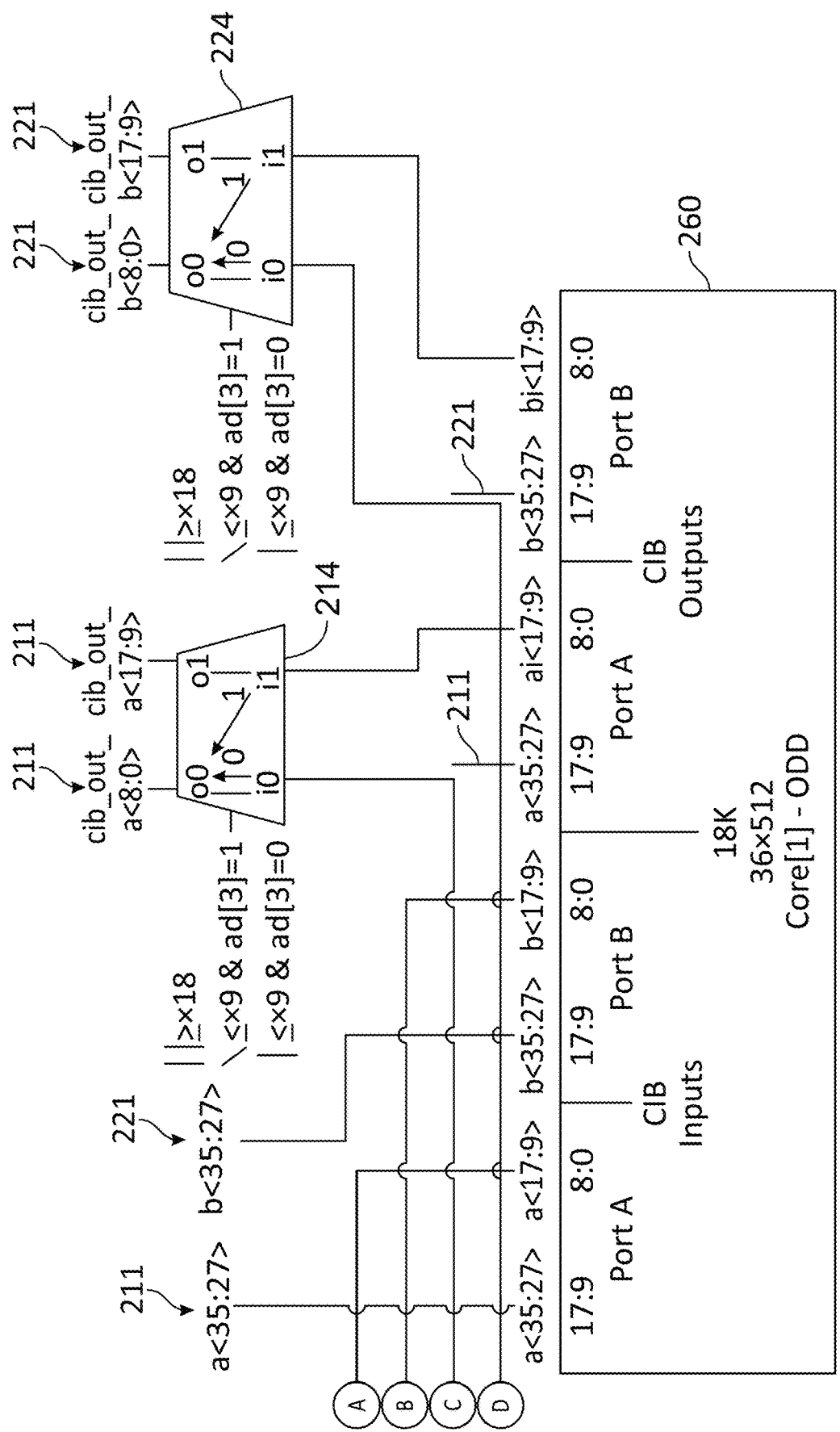

FIG. 3 illustrates a multiplexer architecture of memory block 200 in accordance with an embodiment of the disclosure. In particular, FIG. 3 illustrates further details of the various paths between I/O ports 210/220 and sub-blocks 230/260.

As shown, the most significant bits of data input signals CIBin_A and CIBin_B (bits 35 to 27 and bits 26 to 18) and data output signals CIBout_A and CIBout_B (bits 35 to 27 and bits 26 to 18) pass directly between connections 211/221 and sub-blocks 230/260. The least significant bits of data input signals CIBin_A and CIBin_B (bits 17 to 9 and bits 8 to 0) and data output signals CIBout_A and CIBout_B (bits 17 to 9 and bits 8 to 0) are selectively routed between connections 211/221 and sub-block 230 or 260 through multiplexers 212/214/222/224 in response to various control signals provided by logic blocks 104 of PLD 100.

Figure 4A:
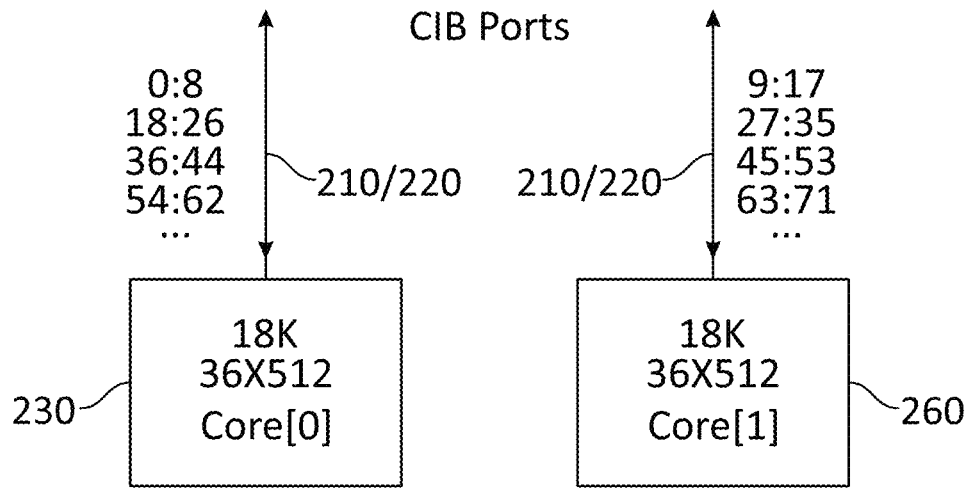
FIGS. 4A and 4B illustrate a memory block operating in a full power mode in accordance with embodiments of the disclosure.
Figure 4B:
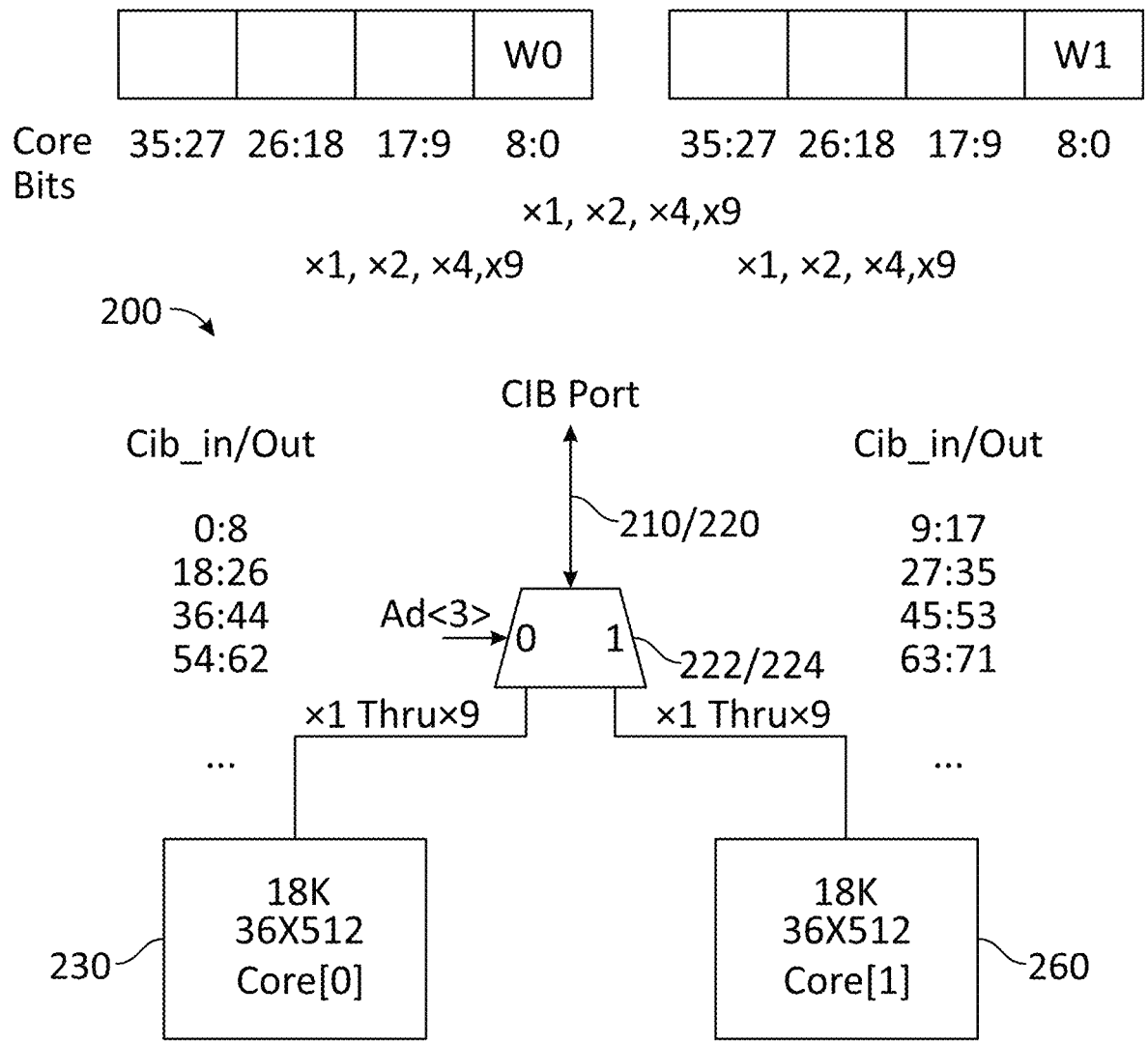

FIGS. 4A and 4B illustrate memory block 200 operating in a full power mode in accordance with embodiments of the disclosure. Referring to FIG. 4A, memory block 200 is operated in full power mode with sub-blocks 230 and 260 both powered on. In this embodiment, data words of 1 bit, 2 bits, 4 bits, 9 bits, 18 bits, 36 bits, or 72 bits are supported that are distributed across both of sub-blocks 230 and/or 260, with one of sub-blocks 230 or 260 storing 1 bit, 2 bits, 4 bits, or 9 bits (e.g., in the case of data words of 1 bit, 2 bits, 4 bits, or 9 bits) or each of sub-blocks 230 and 260 storing 9 bits, 18 bits, or 36 bits (e.g., in the case of data words of 18 bits, 36 bits, or 72 bits).

I/O ports 210 and 220 are each 36 bits, and each of sub-blocks 230 and 260 may read and write to one of I/O ports 210 and 220 to support the maximum 72 bit width of the embodiment illustrated in FIG. 3A. For example, the 72 bits collectively supported by the combined I/O ports 210 and 220 (e.g., labeled embedded block RAM (EBR) Bits in FIG. 4A) may be stored across sub-blocks 230 and 260 with 36 bits (e.g., labeled Core Bits in FIG. 4A) stored in each of sub-blocks 230 and 260 (e.g., bits 62 to 54, 44 to 36, 26 to 18, and 8 to 0 stored in sub-block 230 and bits 71 to 63, 53 to 45, 35 to 27, and 17 to 9 stored in sub-block 260).

Referring to FIG. 4B, memory block 200 is operated in full power mode with sub-blocks 230 and 260 both powered on. In this embodiment, data words of 1 bit, 2 bits, 4 bits, and 9 bits are supported and are stored in both of sub-blocks 230 and 260, with each of sub-blocks 230 and 260 storing 1 bit, 2 bits, 4 bits, and 9 bits in an alternating manner through the operation of multiplexers 222/224.

Figure 5A:
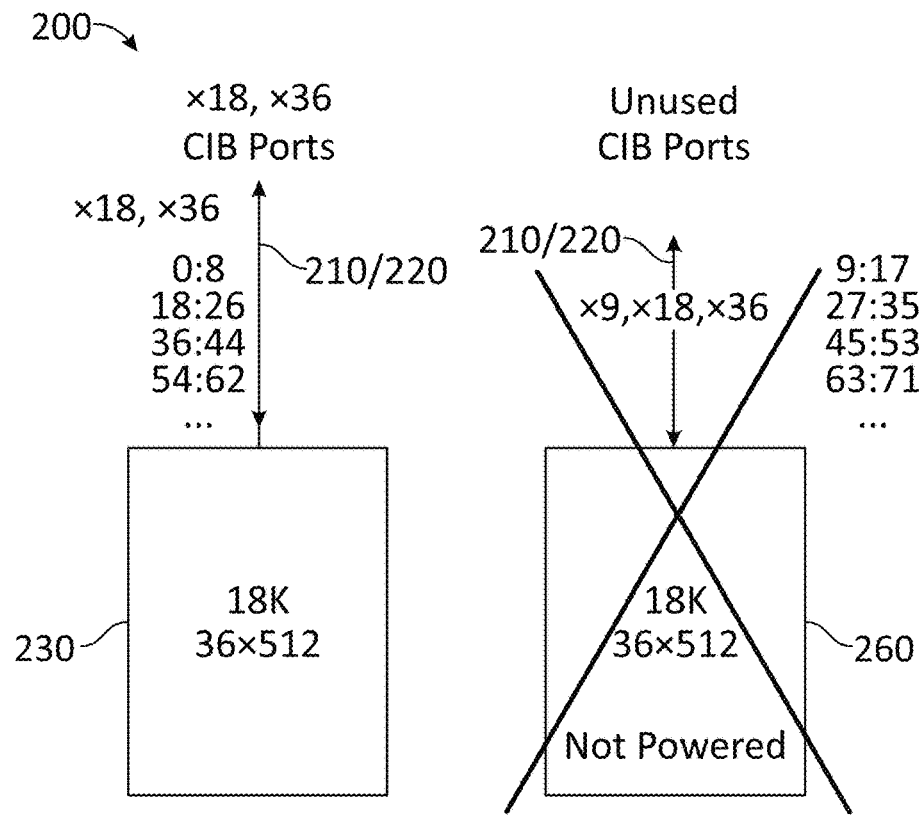
FIGS. 5A and 5B illustrate a memory block operating in a half power mode in accordance with embodiments of the disclosure.
Figure 5B:
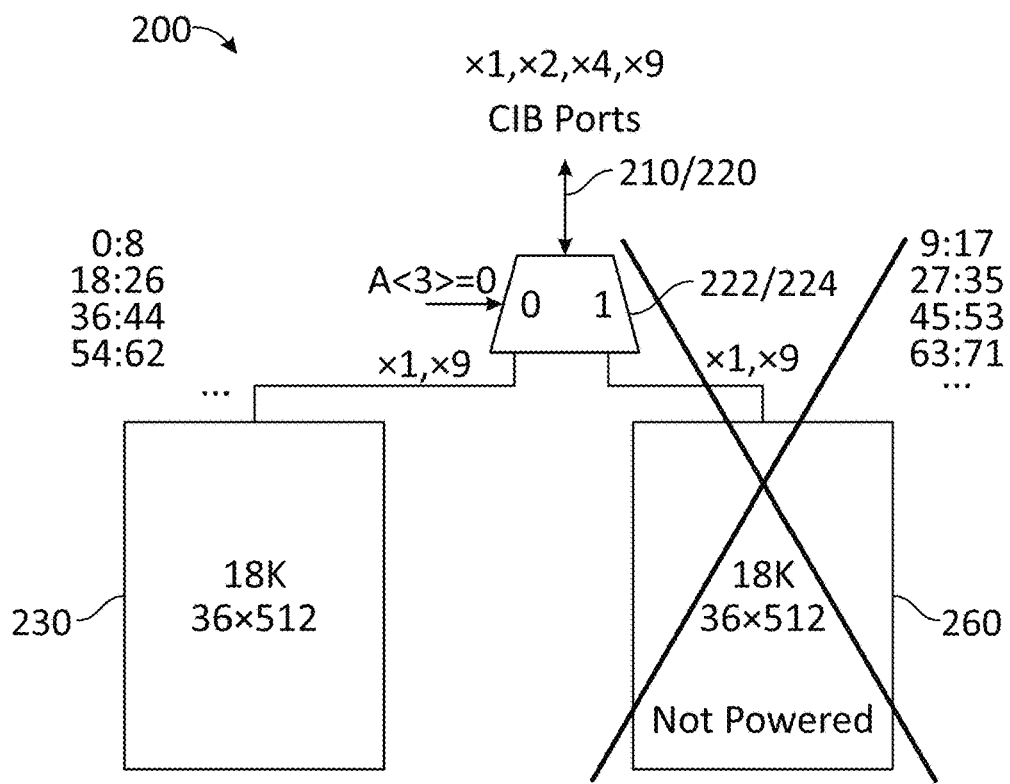

FIGS. 5A and 5B illustrate memory block 200 operating in a half power mode in accordance with embodiments of the disclosure. Referring to FIG. 5A, memory block 200 is operated in half power mode with sub-block 230 powered on and sub-block 260 powered off. In this embodiment, data words of 18 bits or 36 bits are supported and stored only in sub-block 230.

As discussed, I/O ports 210 and 220 are each 36 bits. Accordingly, sub-block 230 may read and write to either or both of I/O ports 210 and 220. 36 bits of the 72 bits collectively supported by the combined I/O ports 210 and 220 may be stored in sub-block 230 (e.g., bits 62 to 54, 44 to 36, 26 to 18, and 8 to 0) while sub-block 260 operates in half power mode.

Referring to FIG. 5B, memory block 200 is operated in half power mode with sub-block 230 powered on and sub-block 260 powered off. In this embodiment, data words of 1 bit, 2 bits, 4 bits, and 9 bits are supported and stored in sub-block 230. As shown, sub-block 230 may store 36 of the 72 bits collectively supported by the combined I/O ports 210 and 220 in a similar manner as discussed with regard to FIG. 5A, but with multiplexers 222/224 performing the routing to sub-block 230.

Figure 6:
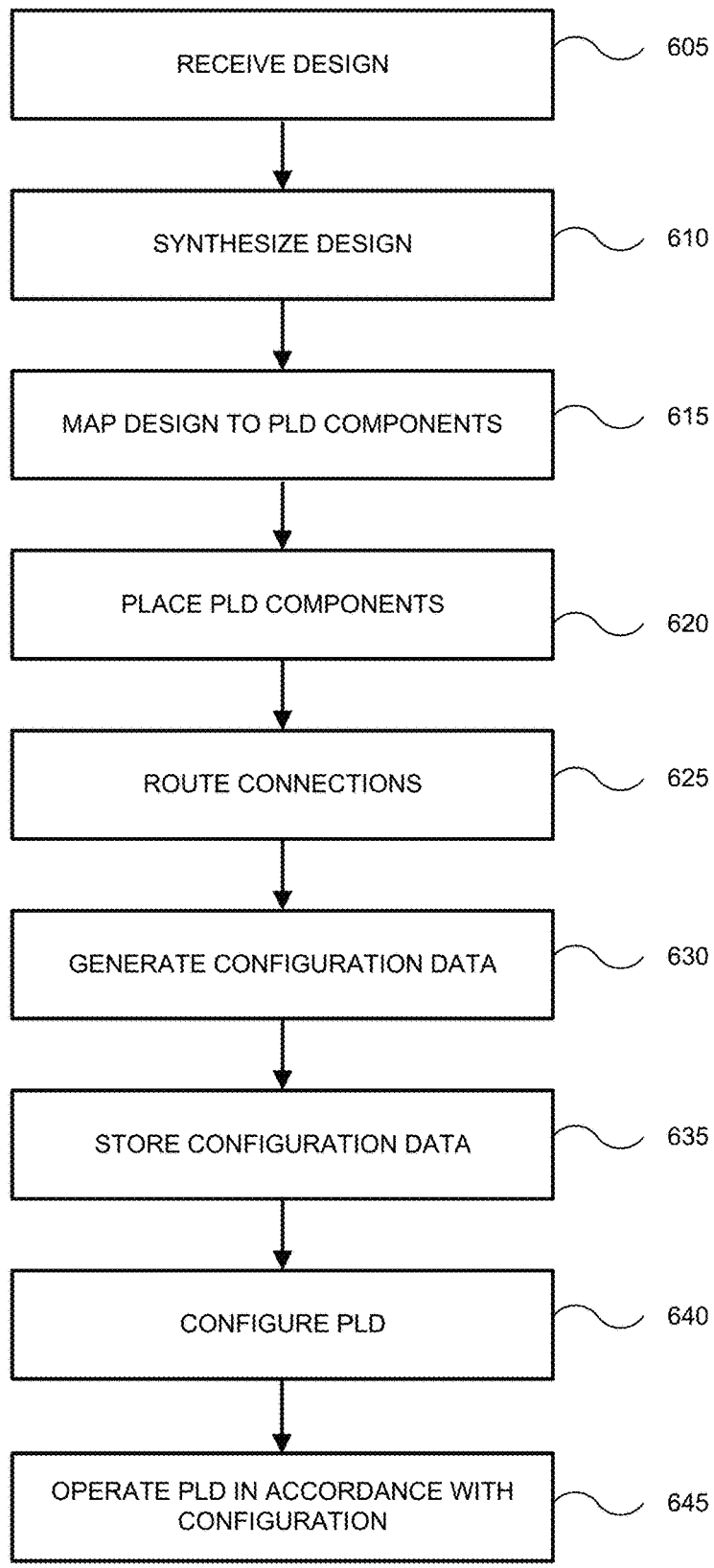
FIG. 6 illustrates a design process for a PLD in accordance with an embodiment of the disclosure.

FIG. 6 illustrates a design process for PLD 100 in accordance with an embodiment of the disclosure. For example, the process of FIG. 6 may be performed by system 130 running an appropriate configuration application as discussed. In some embodiments, the various files and information referenced in FIG. 6 may be stored, for example, in one or more databases and/or other data structures in memory 134, machine-readable medium 136, and/or otherwise.

In operation 605, system 130 receives user design information that specifies the desired functionality of PLD 100. For example, the user may interact with system 130 (e.g., through user input device 137 and hardware description language (HDL) code representing the design) to identify various features of the user design (e.g., high level logic operations, hardware configurations, and/or other features). In some embodiments, the user design may be provided in a register transfer level (RTL) description (e.g., a gate level description). Also in operation 605, system 130 may perform one or more rule checks to confirm that the user design describes a valid configuration of PLD 100. For example, system 130 may reject invalid configurations and/or request the user to provide a new user design as appropriate.

In operation 610, system 130 synthesizes the overall design to be implemented by PLD 100 to create a netlist (e.g., a synthesized RTL description) identifying an abstract logic implementation of the overall PLD design. In some embodiments, the netlist may be stored according to a particular file format, such as Electronic Design Interchange Format (EDIF) in a Native Generic Database (NGD) file.

In operation 615, system 130 performs a mapping process that identifies components of PLD 100 that may be used to implement the PLD design. In this regard, system 130 may map the netlist to various types of components provided by PLD 100 (e.g., logic blocks 104, embedded hardware such as memory blocks 106 including memory blocks 200, and/or other portions of PLD 100) and their associated signals (e.g., in a logical fashion, but without yet specifying placement or routing). In some embodiments, the mapping may be performed on one or more previously-stored files, with the mapping results stored as a physical design file (e.g., also referred to as an NCD file).

In operation 620, system 130 performs a placement process to assign the mapped netlist components to particular physical components residing at specific physical locations of the PLD 100 (e.g., assigned to particular logic blocks 104, memory blocks 106 including memory blocks 200, and/or other physical components of PLD 100), and thus determine a layout for the PLD 100.

In some embodiments, operations 615 and/or 620 may include identifying whether the various memory blocks 200 of PLD 100 will be operated in any of the various full power or half power modes discussed herein, or completely disabled (e.g., with sub-blocks 230 and 260 both powered off if a particular memory block 200 is not used in the current design). For example, if system 130 determines that half or less of the capacity of any of memory blocks 200 are required for the current design, the process of FIG. 6 may configure such memory blocks 200 to power down at least one of sub-blocks 230 or 260.

In operation 625, system 130 performs a routing process to route connections (e.g., using routing resources 180) among the components of PLD 100 based on the placement layout determined in operation 620 to realize the physical interconnections among the placed components.

Thus, following operation 625, the user design will have been synthesized (e.g., converted and optimized), mapped, placed, and routed for PLD 100. Accordingly, in operation 630, system 130 generates configuration data for the completed user design.

In operation 635, the configuration data is stored for subsequent use by PLD 100. For example, in some embodiments, the configuration data is stored in a non-volatile machine-readable memory (e.g., within PLD 100 itself or external to PLD 100 such as in machine-readable medium 136). When PLD 100 is started (e.g., powered on), the configuration data is loaded from the non-volatile memory into appropriate volatile memory of PLD 100 to configure PLD 100 for use. In other embodiments, the configuration data is stored by external system 130 and/or machine-readable medium 136 and loaded into appropriate volatile memory of PLD 100 when PLD 100 is started.

In operation 640, PLD 100 is configured and operated in accordance with the previously stored configuration data. As a result, in operation 645, PLD 100 may be operated in accordance with the final user design. In this regard, the various memory blocks 200 of PLD 100 may be operated in any of the various full power, half power, or completely disabled modes discussed herein.

Figure 7:
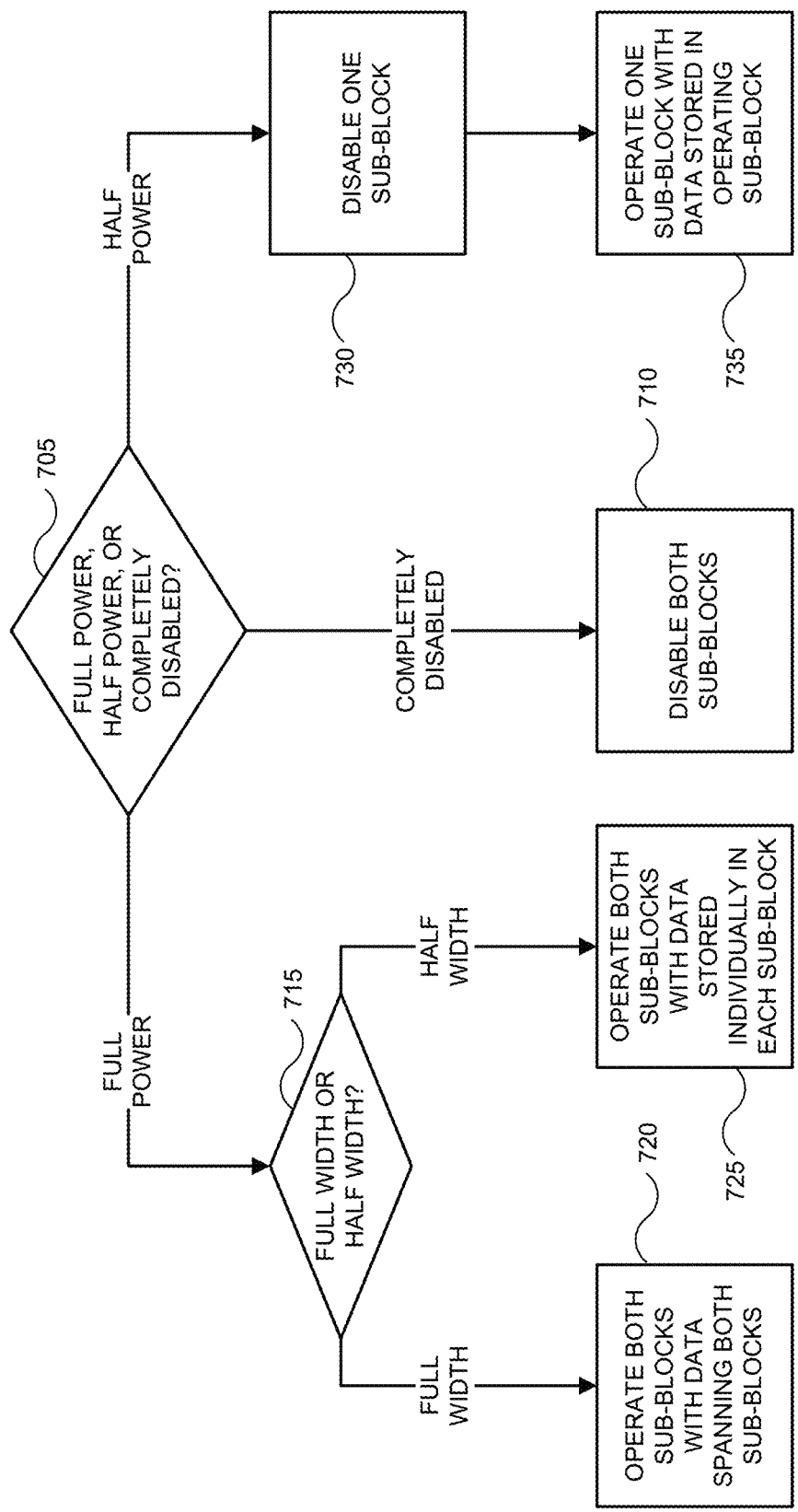
FIG. 7 illustrates a process of configuring a memory block for operation in accordance with an embodiment of the disclosure.

FIG. 7 illustrates a process of configuring memory block 200 for operation in accordance with an embodiment of the disclosure. In some embodiments, the process of FIG. 7 may be performed by system 130 in operations 615 and/or 620 of FIG. 7 for each memory block 200 of PLD 100.

In operation 705, system 130 determines whether a particular memory block 200 should be operated at full power, half power, or completely disabled (e.g., not used) as discussed. If memory block 200 is to be completely disabled (e.g., memory block 200 is not required to store any data in the current design), then the process of FIG. 7 proceeds to operation 710 where system 130 designates memory block 200 as completely disabled and both sub-blocks 230 and 260 are powered off for the current design.

Returning to operation 705, if memory block 200 is to be operated at full power (e.g., memory block 200 is required to store data that exceeds the capacity of one of sub-blocks 230 or 260), then the process of FIG. 7 proceeds to operation 715.

As discussed, in full width operation, each of sub-blocks 230 and 260 stores a portion of each data word (e.g., for data words greater than or equal to 18 bits in some embodiments) such that the combined data word length spans across both sub-blocks 230 and 260. In half width operation, data words are stored separately by each of sub-blocks 230 and 260 (e.g., for data words less than or equal to 9 bits in some embodiments). Accordingly, in operation 715, if memory block 200 is to be operated in a full width mode (e.g., data stored with data word lengths from 18 bits to 72 bits over 512 rows in some embodiments), then the process proceeds to operation 720 where system 130 designates memory block 200 to operate at full power and full width with both sub-blocks 230 and 260 powered on and storing data words spanning both sub-blocks 230 and 260.

Alternatively, in operation 715, if memory block 200 is to be operated in a half width mode (e.g., data stored with data word lengths from 1 bit to 9 bits over 512×2 rows collectively provided by both sub-blocks 230 and 260 in some embodiments), then the process proceeds to operation 725 where system 130 designates memory block 200 to operate at full power and half width with both sub-blocks 230 and 260 powered on and storing data words separately in individual sub-blocks 230 and 260.

Returning to operation 705, If memory block 200 is to be operated at half power (e.g., memory block 200 is required to store data that is within the capacity of only one of sub-blocks 230 or 260 such as up to 18 kilobits in some embodiments, and within the data word width of only one of sub-blocks 230 or 260 such as up to 36 bit data words in some embodiments), then the process of FIG. 7 proceeds to operation 730. In operation 730, system 130 designates one of sub-blocks 230 or 260 to be disabled and powered off for the current design.

In operation 735, system 130 designates the remaining one of sub-blocks 230 or 260 to be enabled and powered on for the current design to store data with data word lengths up to 36 bits over 512 rows provided by the remaining one of sub-blocks 230 or 260.

In view of the present disclosure, it will be appreciated that implementing memory block 200 with sub-blocks 230 and 260 that may be selectively powered on or off may save power in various designs implemented by PLD 100.

Other embodiments are also contemplated. For example, although embodiments of memory block 200 with two sub-blocks 230 and 260 have been described, additional sub-blocks may be provided in other embodiments where any number of the additional sub-blocks may be selectively powered on or off to provide power savings.

In addition, although the full power, half power, and completely disabled modes of operating memory block 200 have been discussed as being determined during the design process of FIG. 6 (e.g., the modes being pre-determined by the configuration of PLD 100), it is contemplated that sub-blocks 230, 260, and/or any additional sub-blocks may alternatively be selectively powered on or off during runtime operation of PLD 100. In this regard, memory block 200 may be operated in various modes if and when the memory requirements of the current design change during operation.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A system comprising:
    a memory block configured to be selectively operated in a full power mode or a half power mode, the memory block comprising:
        an input/output port;
        a first sub-block configured to be powered on during the full power mode and during the half power mode;
        a second sub-block configured to be powered on during the full power mode and powered off during the half power mode;
        routing hardware configured to selectively pass data between the input/output port and the first and second sub-blocks; and
        wherein the first and second sub-blocks are configurable to:
            store the data as data words spanning both the first and second sub-blocks during the full power mode in a first storage configuration; and
            store the data as data words contained separately in the first and second sub-blocks during the full power mode in a second storage configuration.

2. The system of claim 1, wherein the routing hardware is configured to:
    pass the data between the input/output port and the first and second sub-blocks during the full power mode; and
    pass the data between the input/output port and only the first sub-block during the half power mode.

3. The system of claim 1, wherein the first and second sub-blocks are configured to store the data words in an alternating manner in the second storage configuration.

4. The system of claim 1, wherein the first sub-block is configured to store the data as data words contained only in the first sub-block during the half power mode.

5. The system of claim 1, wherein:
    the first sub-block comprises a first memory array configured to store the data during the full power mode and during the half power mode;
    the second sub-block comprises a second memory array configured to store the data during the full power mode and not during the half power mode;
    the first and second memory arrays together provide a first data capacity for the memory block during the full power mode; and
    the first memory array alone provides a second data capacity for the memory block during the half power mode less than the first data capacity.

6. The system of claim 5, wherein:
    the first and second memory arrays each comprise an 18 kilobit array of 36 bits by 512 rows;
    the first data capacity is 36 kilobits; and
    the second data capacity is 18 kilobits.

7. The system of claim 1, wherein the input/output port is a first input/output port, the system further comprising a second input/output port.

8. The system of claim 7, wherein the routing hardware is configured to pass the data between one or more of the first and second input/output ports and one or more of the first and second sub-blocks.

9. The system of claim 7, wherein the routing hardware is configured to pass the data:

between both of the first and second input/output ports and the first sub-block; and
between both of the first and second input/output ports and the second sub-block.

10. The system of claim 1, wherein the system is a programmable logic device (PLD) further comprising:
a configuration memory to store configuration data to implement a user design in the PLD; and
wherein the memory block is selectively operated in the full power mode or the half power mode as determined by the configuration data.

11. A method comprising:
selectively operating a memory block in a full power mode or a half power mode, the memory block comprising an input/output port, a first sub-block, a second sub-block, and routing hardware;
powering on the first sub-block and the second sub-block during the full power mode;
powering on the first sub-block and powering off the second sub-block during the half power mode;
selectively passing data by the routing hardware between the input/output port and the first and second sub-blocks; and
wherein the first and second sub-blocks are configurable to:
store the data as data words spanning both the first and second sub-blocks during the full power mode in a first storage configuration, and
store the data as data words contained separately in the first and second sub-blocks during the full power mode in a second storage configuration.

12. The method of claim 11, wherein the passing comprises:
passing the data between the input/output port and the first and second sub-blocks during the full power mode; and
passing the data between the input/output port and only the first sub-block during the half power mode.

13. The method of claim 11, further comprising storing the data in an alternating manner between the first and second sub-blocks in the second storage configuration.

14. The method of claim 11, further comprising storing the data as data words contained only in the first sub-block during the half power mode.

15. The method of claim 11, further comprising:
storing the data in a first memory array of the first sub-block during the full power mode and during the half power mode;
storing the data in a second memory array of the second sub-block during the full power mode and not during the half power mode;
wherein the first and second memory arrays together provide a first data capacity for the memory block during the full power mode; and
wherein the first memory array alone provides a second data capacity for the memory block during the half power mode less than the first data capacity.

16. The method of claim 15, wherein:
the first and second memory arrays each comprise an 18 kilobit array of 36 bits by 512 rows;
the first data capacity is 36 kilobits; and
the second data capacity is 18 kilobits.

17. The method of claim 11, wherein:
the input/output port is a first input/output port; and
the memory block further comprises a second input/output port.

18. The method of claim 17, wherein the passing comprises passing the data between one or more of the first and second input/output ports and one or more of the first and second sub-blocks.

19. The method of claim 17, wherein the passing comprises:
passing the data between both of the first and second input/output ports and the first sub-block; and
passing the data between both of the first and second input/output ports and the second sub-block.

20. The method of claim 11, wherein the method is performed by a programmable logic device (PLD), the method further comprising:
storing configuration data in a configuration memory to implement a user design in the PLD; and
wherein the operating the memory block in the full power mode or the half power mode is determined by the configuration data.

* * * * *